UNITED STATES PATENT OFFICE 2,261,165

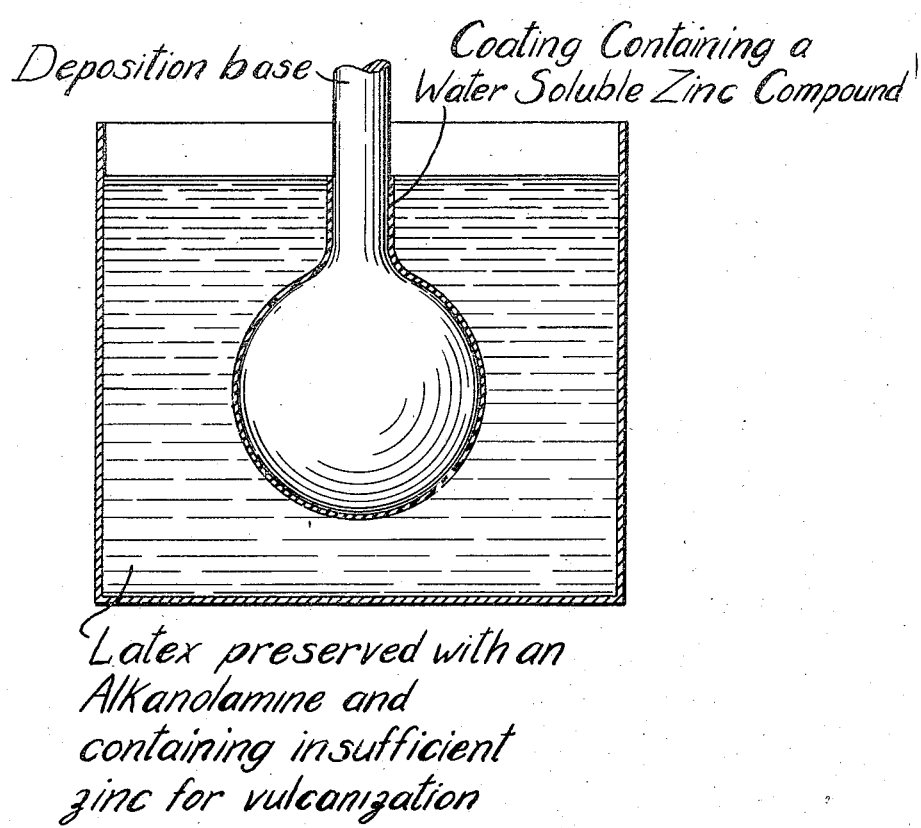

MANUFACTURE OF RUBBER GOODS FROM LATEX

Robert A. Lees, Akron, Ohio, assignor to American Anode, Inc., Akron, Ohio, a corporation of Delaware Application June 16, 1938, Serial No. 214,047

6 Claims. (Cl. 18—58)

This invention relates to the manufacture of rubber goods from liquid rubber latex and especially to the manufacture of rubber goods by processes in which rubber is deposited from latex by means of a chemical coagulant.

There is now in widespread commercial use a process of manufacturing rubber goods in which a deposition form is provided with a coating containing a latex coagulant and then immersed in or otherwise associated with liquid rubber latex until a layer of latex rubber coagulum of a desired thickness has been deposited upon the form, as more fully described in U. S. Patents Nos. 1,908,719 and 1,996,051. Ordinarily, the latex used in such processes is a compounded latex containing all vulcanizing ingredients necessary to effect vulcanization of the rubber after it is deposited from the latex. In some cases, however, it is undesirable to add to the latex the metallic activator, such as a zinc compound, necessary to effect vulcanization, and, in U. S. Patent No. 2,006,862, it has been proposed to utilize a compounded latex which does not contain the metallic activator necessary for vulcanization and to supply such activator by diffusing it into the rubber during or after the deposition of the rubber on the form. In a preferred embodiment of that method, the deposition form is coated with a metallic compound which will serve both to coagulate the latex and to supply the necessary activator of vulcanization. Water-soluble zinc salts such as zinc chloride or zinc nitrate, for example, are excellent latex coagulants and also supply the zinc necessary for vulcanization of the rubber, as the soluble zinc salt is precipitated in the deposited rubber as insoluble zinc hydroxide by reaction with ammonium hydroxide present in the latex as a preservative, and the zinc hydroxide is decomposed to the likewise insoluble zinc oxide on heating. The insolubilization of the soluble zinc salt is important because soluble materials usually are washed out of the rubber during the washing operation necessary in the manufacture of high quality rubber goods.

Considerable difficulty was encountered, however, in adapting this process to commercial manufacturing operations. It was found that the alkalinity of the latex had to be carefully maintained above a determined minimum value to insure precipitation of an adequate quantity of zinc to effect proper vulcanization of the rubber. If the alkalinity of the latex was permitted to drop, the tensile strength, ageing characteristics and general quality of the vulcanized rubber likewise dropped by reason of the improper vulcanization resulting from the lack of an adequate quantity of zinc. On raising the alkalinity to considerably higher values in an effort to insure the precipitation of adequate quantities of zinc, it was found that the zinc was precipitated too rapidly and produced white blotches of zinc compound at the surface of the vulcanized rubber, which of course was undesirable, and also that the deposit frequently was stratified as a result of the precipitation of excess zinc. In other words, if the alkalinity of the ammonia-preserved latex was adjusted to produce a rubber having a satisfactory appearance, the tensile strength and ageing characteristics of the rubber were not satisfactory. If, on the other hand, the alkalinity was adjusted to produce satisfactory vulcanization and resulting high tensile strength and good ageing properties, the deposit was stratified and the appearance of the article was ruined by unsightly white blotches of zinc compound.

After considerable experimentation, the best that could be done toward overcoming these disadvantages was to compromise by operating under the highest conditions of alkalinity possible without producing stratification and white blotches. By carefully maintaining the alkalinity of the latex within a narrow range a passable product was obtained. The appearance of the product was satisfactory but physical properties were sacrificed as the tensile strength, for example, of a product made under such compromise conditions was about 25% under the maximum which could be obtained by operating with latex only slightly more alkaline.

Furthermore, it was difficult to maintain the alkalinity of the latex within the prescribed limits. Ammonia continually evaporated from the latex requiring frequent checking of the alkalinity and continual addition of compensating quantities of ammonia. Changes in other constituents of the compounded latex, which frequently are necessary, upset the carefully controlled alkalinity and required readjustment. Replacement of the volatile ammonia by non-volatile preservatives in common use such as potassium hydroxide did not remedy the situation, as the strong potassium hydroxide neutralized the coagulant and interfered with the deposition process and also reacted with the zinc compounds to form soluble zincates which were removed from the deposited rubber during the washing operation.

I have now discovered that all the difficulties and disadvantages hereinabove discussed may be entirely eliminated and overcome by utilizing latex preserved and stabilized with an alkanolamine, for example, triethanolamine. The alkalinity of such a latex may be raised to the relatively high value necessary to obtain optimum vulcanization without producing any blotches, stratification or other undesirable results whatever. As an incidental advantage, the alkanolamines are non-volatile so that the latex, when once properly adjusted, will maintain a proper operating condition for long periods of time.

The latex for use in the process may be prepared by adding the requisite quantity of alkanolamine to fresh raw latex on the plantations, or the common ammonia-preserved latex of commerce may be modified by adding a suitable quantity of alkanolamine and then removing all or a substantial portion of the ammonia. Preferably not more than 0.1% ammonia is allowed to remain in the latex. The quantity of alkanolamine added in either case will vary, of course, to suit requirements of various operating conditions, but generally will be used in proportions of from 0.25% to 10.0% by volume on the latex. Raw latex may be satisfactorily preserved and stabilized by the addition of 1% triethanolamine promptly after the latex is collected from the rubber tree.

The invention will now be described in more detail as applied in several specific examples to the manufacture of various types of rubber goods.

*Example 1.*—To manufacture a surgeon's rubber glove, for example, a latex composition is prepared by mixing 100 parts by weight of rubber in the form of the centrifugally concentrated, ammonia-preserved latex of commerce containing about 60% total solids and 0.65% of ammonia, 1 part sulfur, 0.3 part of an organic accelerator such as mercaptobenzothiazole, 1.3 parts age-resister, and 4 parts of triethanolamine; the sulfur, accelerator, and age-resister being added as colloidal dispersions as in usual practice. Substantially all the ammonia is then removed from the mixed latex in any well known manner as by heating it to 120° F., agitating, and blowing air across the surface for about 48 to 72 hours.

A glazed porcelain glove form is then heated to about 140° F. and immersed momentarily in a coagulant composition containing 200 grams of zinc chloride, 130 c. c. of butyl lactate and 20 c. c. of lactic acid dissolved in 1000 c. c. of denatured alcohol. The form is withdrawn from the coagulant composition, rotated in air several minutes to distribute the composition evenly over the form and to permit evaporation of the solvent, after which the coated form is immersed in the prepared latex composition for 30 seconds and withdrawn together with a deposited coating of latex coagulum. The coagulum is washed thoroughly in running water, and then is dried and vulcanized by heating according to usual practice.

The rubber of the finished surgeon's glove is found to be well vulcanized, to have a high tensile strength of around 5000 pounds per sq. inch, to possess excellent ageing characteristics, and to be entirely free of stratification and white blotches.

*Example 2.*—To manufacture toy balloons, for example, a latex composition is prepared utilizing concentrated latex of 60% solids content containing 1% of triethanolamine added at the rubber plantation, the latex containing no ammonia. To 100 parts by weight of rubber in the form of such latex is added 1.1 parts of sulfur, 0.35 part of an organic accelerator, and 1.0 part of age-resister, all as colloidal dispersions.

A toy balloon form is immersed in a coagulant composition containing 300 grams of zinc chloride, 150 c. c. of ethyl lactate, and 30 c. c. of lactic acid dissolved in 1000 c. c. of denatured alcohol, then withdrawn and the solvent is evaporated to produce a non-flowing coagulant coating on the form. The coated form is then immersed in the prepared latex composition until the desired thickness of rubber has been deposited, and the deposited rubber is dried and vulcanized as usual in toy balloon manufacture.

*Example 3.*—To manufacture rubber sheet, a latex composition is prepared by adding 3% of tripropanolamine to the ordinary centrifugally concentrated ammonia-preserved latex of commerce, and the latex is "blown" to remove substantially all the ammonia as described in Example 1. The latex so-prepared is compounded by adding to each 100 parts by weight of rubber in the form of such latex 3 parts of sulfur, 2 parts zinc oxide, 0.5 part age-resister, 5.0 parts of a pigment such as titanium dioxide, and 0.8 part organic accelerator, all added in the usual manner.

A travelling belt constituting a sheet deposition base is coated with a coagulant composition containing 400 grams of zinc nitrate and 50 c. c. of lactic acid dissolved in each 1000 c. c. of methanol. The coating is allowed to dry, and the coagulant coated sheet base is brought into progressive floating contact with the surface of the latex composition. The resulting sheet of coagulum is superficially dried on the base, removed, washed, dried, and vulcanized in the usual manner, to produce a high quality, uniformly vulcanized sheet of rubber.

As the latex in the foregoing Example 3 contains a white pigment, the presence of white blotches would be less objectionable than on unpigmented articles having the natural amber color of latex rubber, but the present invention is nevertheless valuable in such cases for eliminating stratification and producing a more uniform vulcanizate and assuring uniform operating conditions.

In the foregoing specific examples, the coagulant composition in each case contained lactic acid either alone or together with a lactic acid ester for the purpose of securing more uniform interfacial contact between the coagulant composition and the form and between the coagulant composition and the latex. Other materials serving the same function are disclosed in U. S. Patent No. 1,996,090. Although not essential to the present invention, the use of such agents in the coagulant is desirable and it should therefore be noted that the alkalinity of the alkanolamine-preserved latex will be varied somewhat as the acidity of the coagulant composition is varied. To indicate the inter-relation between the acidity of the coagulant composition and the alkalinity of the latex, test data on rubber deposited under varying conditions will now be given.

In the tests, rubber was deposited from a latex composition which, except for variations in the preservative or stabilizer, was identical with a standard latex composition used in the commercial manufacture of surgeons' gloves substantially as set out in the preceding Example 1. The coagulant composition, likewise, was a composition regularly used in the commercial production of surgeons' gloves substantially as set out in the example, except for variations in the quantity of lactic acid added.

Rubber deposits were produced according to standard technique, using latex compositions containing varying proportions of triethanolamine as the stabilizing agent and with coagulant compositions containing different quantities of lactic acid. The ultimate tensile strength of the vulcanized rubber produced in each case was determined and the results are tabulated below, the tensiles being expressed in pounds per square inch:

| Per cent triethanolamine in latex | Coagulant containing 2% lactic acid | Coagulant containing 4% lactic acid |
|---|---|---|
| | Tensile | Tensile |
| 0.25 | 4100 | 3800 |
| 0.50 | 4300 | 4300 |
| 1.0 | 5200 | 5000 |
| 2.0 | 5100 | 5250 |

Surgeons' gloves produced commercially from ammonia-preserved latex adjusted to optimum compromise conditions of alkalinity showed average tensile strengths of around 4300 pounds per square inch. It will therefore be seen that the use of triethanolamine under optimum conditions will effect an increase in tensile strength of as much as 20% to 25%. When utilizing the present invention in the commercial production of surgeons' gloves, tensile strengths averaging 4800 to 4900 pounds per square inch are regularly obtained.

As hereinabove indicated, other alkanolamines may be used in place of the triethanolamine and tripropanolamine mentioned in the foregoing specific examples. Thus, monoethanolamine, diethanolamine, monopropanolamine, dipropanolamine, monobutanolamine, dibutanolamine, tripropanolamine and similar hydroxy amines may be used, the quantity being varied in accordance with the decreasing activity of the longer chain compounds.

The single figure of the accompanying drawing illustrates diagrammatically an application of the process of the present invention. The drawing shows a deposition base of conventional character provided with a coating containing a water soluble compound of zinc, the coated base being immersed in a latex composition preserved with an alkanolamine and containing insufficient zinc for vulcanization. Rubber of a desired thickness is permitted to accumulate on the base and the rubber is then dried and vulcanized by heating in the usual manner. The zinc necessary to vulcanize the rubber to an optimum state is supplied from the coating on the base and is insolubilized within the rubber by reaction with the alkanolamine.

Numerous variations in details of procedure, technique, and material used of course may be made without departing from the spirit and scope of the invention. As numerous such variations are fully disclosed in the various prior patents herein referred to, no attempt has been made to set forth here all the well known equivalents of the materials and procedures utilized in the present invention. For example, activating compounds of metals other than zinc may be used, and the activating compound may be supplied by treating one or both faces of the freshly deposited coagulum with an aqueous solution of the activator compound which at the same time may or may not function as a coagulant for the latex, all as more fully described in the U. S. Patent No. 2,006,862 hereinabove referred to. Although especially useful in connection with the process described, the modified latex prepared in accordance with the principles of the present invention finds wide utility in other latex deposition processes as well as in other processes utilizing latex for coating and impregnating a variety of materials, including metal, wood, fabric, paper, and the like.

All such modifications and variations are intended to be included within the scope of the appended claims unless otherwise specifically indicated.

I claim:

1. The method of manufacturing vulcanized rubber goods from latex which comprises preparing a latex composition containing some of the agents necessary for vulcanization but not sufficient metallic activator, said latex composition being preserved and stabilized with an alkanolamine employed in a quantity sufficient to react with and precipitate a quantity of a metallic activator necessary to effect vulcanization, depositing rubber coagulum from the latex composition in a form appropriate to the character of the goods to be produced, diffusing into the coagulum a quantity of a soluble metal compound which will function as an activator of vulcanization and which will be precipitated by the alkanolamine, and drying and vulcanizing the rubber.

2. A method as defined by claim 1 in which the alkanolamine is triethanolamine.

3. A method of manufacturing vulcanized rubber goods from latex which comprises preparing a latex composition containing insufficient metallic activator for satisfactory vulcanization, said latex composition being preserved and stabilized with an alkanoalamine, applying to a deposition base a coating containing a water-soluble compound which will supply the necessary activator and which will be precipitated by reaction with the alkanolamine, depositing a layer of rubber coagulum on the deposition base, permitting a substantial quantity of the soluble activator compound to diffuse into the coagulum and react with the alkanolamine, and drying and vulcanizing the rubber.

4. A method as defined by claim 3 in which the alkanolamine is triethanolamine.

5. A method of manufacturing vulcanized rubber goods from latex which comprises preparing a latex composition containing insufficient zinc for satisfactory vulcanization, said latex composition being preserved and stabilized with an alkanolamine, applying to a deposition base a coating containing a water-soluble zinc salt which will react with the said alkanolamine to precipitate an insoluble zinc compound, associating the coated deposition base with the latex composition until a layer of rubber coagulum of a desired thickness has been deposited on the base, a quantity of the zinc compound necessary to effect vulcanization of the rubber being precipitated within the rubber coagulum, and drying and vulcanizing the rubber.

6. A method as defined by claim 5 in which the alkanolamine is triethanolamine.

ROBERT A. LEES.